(12) United States Patent
Sullivan et al.

(10) Patent No.: US 7,408,274 B2
(45) Date of Patent: Aug. 5, 2008

(54) CONTROL AND OPERATING CONDITION MONITORING OF DUAL SERIES SWITCH CONTACTORS FOR ELECTRIC MOTOR OR OTHER ELECTRICAL LOAD

(75) Inventors: James D. Sullivan, Galena, OH (US); John A. Melvin, Westerville, OH (US)

(73) Assignee: Inpower LLC, Galena, OH (US)

( * ) Notice: Subject to any disclaimer, the term of this patent is extended or adjusted under 35 U.S.C. 154(b) by 246 days.

(21) Appl. No.: 11/319,825

(22) Filed: Dec. 28, 2005

(65) Prior Publication Data

US 2007/0035903 A1     Feb. 15, 2007

Related U.S. Application Data

(60) Provisional application No. 60/640,548, filed on Dec. 30, 2004.

(51) Int. Cl.
*H01H 35/00* (2006.01)
(52) U.S. Cl. .................. 307/130; 307/131; 361/115; 324/422; 340/638
(58) Field of Classification Search ............. 307/115, 307/140, 141.8, 142, 328, 130, 131; 361/65, 361/79, 115; 327/401; 700/293; 324/422; 477/7; 340/638, 644
See application file for complete search history.

(56) References Cited

U.S. PATENT DOCUMENTS

| | | | | |
|---|---|---|---|---|
| 4,420,784 A | * | 12/1983 | Chen et al. ..................... 361/7 |
| 5,455,733 A | * | 10/1995 | Waggamon ................. 361/115 |
| 5,689,395 A | * | 11/1997 | Duffy et al. ................. 361/93.6 |
| 5,689,397 A | * | 11/1997 | Pohl et al. .................. 361/115 |
| 5,889,339 A | * | 3/1999 | Bildgen ...................... 307/125 |
| 5,940,260 A | * | 8/1999 | Gelbien et al. ................ 361/62 |
| 6,232,781 B1 | * | 5/2001 | Goser et al. ................. 324/422 |

(Continued)

*Primary Examiner*—Michael J Sherry
*Assistant Examiner*—Daniel Cavallari
(74) *Attorney, Agent, or Firm*—Frank H. Foster; Kremblas, Foster, Phillips & Pollick

(57) ABSTRACT

A circuit for controlling at least two power switches that are series connected between a source of electrical power and an electrical load, for energizing the load in response to a signal at a control input. The circuit includes a programmed controller having an input as the control input and a voltage sensor circuit connected to sense the voltage between the power switches and apply a voltage signal to a controller input. It may also have a sensor for sensing the current through the switches and applying a current signal to the controller. The controller inputs the voltage between the switches or the current through the switches to provide a sensed first value. It compares the sensed first value to an expected first value that exists if both switches are turned off. One of the two switches is turned on if the sensed first value is equal to the expected first value. If the first switch was turned on, the voltage at the node between the switches or the current through the switches is sensed to provide a sensed second value. The sensed second value is compared to an expected second value that exists if the first switch is turned on and the second switch is turned off. If the sensed second value is equal to the expected second value, the second switch is turned on. At any of these stages, if a sensed value is unequal to the expected value, turning on of the switches is aborted and both switches are turned off.

14 Claims, 10 Drawing Sheets

U.S. PATENT DOCUMENTS

| | | | |
|---|---|---|---|
| 6,278,596 B1 * | 8/2001 | Simpson | 361/42 |
| 6,288,881 B1 * | 9/2001 | Melvin et al. | 361/18 |
| 6,297,569 B1 * | 10/2001 | Bartels et al. | 307/140 |
| 6,496,342 B1 * | 12/2002 | Horvath et al. | 361/65 |
| 6,657,833 B2 * | 12/2003 | Matsuki et al. | 361/23 |
| 6,925,103 B2 * | 8/2005 | Ishikawa et al. | 372/96 |
| 6,985,800 B2 * | 1/2006 | Rehtanz et al. | 700/292 |
| 2002/0070608 A1 * | 6/2002 | Matsuki et al. | 307/9.1 |

* cited by examiner

CONTROL AND OPERATING CONDITION MONITORING OF DUAL SERIES SWITCH CONTACTORS FOR ELECTRIC MOTOR OR OTHER ELECTRICAL LOAD

CROSS-REFERENCES TO RELATED APPLICATIONS

This application claims the benefit of U.S. Provisional Application No. 60/640,548 filed Dec. 30, 2004.

BACKGROUND OF THE INVENTION

1. Field of the Invention

This invention relates generally to the fail safe switching of electrical power to an electric load, such as an electric motor driving a hydraulic pump of a wheel chair lift, through a pair of series connected power switches or contactors and more particularly relates to both the control of the sequential switching of such switches as well as the monitoring of the switch operating conditions in association with the sequential switching process in order to detect switch malfunctions.

2. Description of the Related Art

There are many types of machines that transport people or move mechanical apparatus in the vicinity of people or otherwise require reliable control so they do not malfunction and cause personal injury or property damage. One of the most common electrical loads associated with such machines is an electric motor that is or drives a prime mover to move the mechanical apparatus. Such machines should not only operate when they are signaled or otherwise commanded to operate, but of more critical importance to safety is that they stop operating when they are signaled or otherwise commanded to stop. Although the invention is applicable to a broad variety of machines with electrical loads that have such control and safety requirements, it is illustrated in connection with one such machine, a wheelchair lift having an electric motor driven hydraulic pump as its prime mover.

Many buses and vans are equipped with hydraulic wheelchair lift systems. In wheelchair lift systems, safety is probably the single most important factor. These lifts transport people who have a physical disability and it is particularly desirable to avoid jeopardizing them with apparatus that has the possibility of failing and causing personal injury.

Typically, these lift systems consist of a platform that can be folded and unfolded between a vertically oriented, stowed position in the vehicle and an unstowed, transporting position horizontally extending from the vehicle floor. From its unfolded or unstowed position, the platform can be raised and lowered between the vehicle's floor level and the ground level like an elevator. The lift of FIG. 1 is a typical wheel chair lift system. Most such prior art lift systems use essentially the general principles that are illustrated. The lift allows a person in a wheelchair to roll along the ground and onto the lift platform to be raised into the vehicle. The platform is then raised from ground level up to the vehicle's floor level. After reaching the floor level, the person rolls from the platform into the vehicle. Then the person operates the mechanism to cause the platform to pivot into the vehicle and stow the lift in the vehicle.

To minimize the cost and complexity of a wheelchair lift system, it is advantageous to perform the platform lifting function and the stowing function utilizing a single hydraulic cylinder or two or more cylinders 1 operated hydraulically in parallel, such as illustrated in FIG. 1.

FIG. 2 shows the fundamental mechanical structures of a typical wheel chair lift system that incorporates a hydraulic cylinder 1 to perform both the wheelchair lowering and lift functions and the platform deployment and stow functions. The system includes a first fixed vertical pillar 2 that is securely attached to the vehicle. A lifting platform 3 is attached to a second, vertically movable, vertical pillar 4 at a hinging pivot 5. A brace 9 is attached between the vertical pillar 4 and the platform 3 in such a fashion as to limit the range of motion of platform 3 around hinging point 5 so that it can pivot to no more than a 90° angle to the vertical pillar 4. The vertical pillars 2 and 4 are mechanically coupled to each other with two parallel equal length arms 6 and 7 that are hinged at their attachment points to the vertical pillars 2 and 4. The hydraulic cylinder 1, when operated, raises the platform 3 from ground level up to vehicle floor level. Whenever the platform 3 is raised above floor level, a stop 8 engages a platform protrusion 3a which directs the motion of the platform 3 around its hinging point 5 causing the platform 3 to fold, that is to pivot upwardly about its pivot axis 5 near its innermost edge until it reaches a substantially vertical orientation.

This operation is illustrated in more detail in FIG. 3 but the hydraulic cylinder is not illustrated in order to simplify the drawing and because it can be located in multiple optional positions. As known to those skilled in the art, the hydraulic cylinder or cylinders can be located to either push or pull in order to raise the lift, depending upon which obliquely opposite pivots for the arms 6 and 7 that it is connected to in the parallelogram arrangement that supports the platform. A hydraulic cylinder can also be attached separately from the pivots for the arms 6 and 7 since the purpose of a hydraulic cylinder is to raise and allow lowering of the vertical pillar 4 relative to the vertical pillar 2.

A wheelchair lifting cycle begins, as illustrated in FIG. 3A, with the wheelchair lift system fully deployed so that the platform 3 is resting at ground level. In this position a wheelchair can easily be rolled on to or off of the platform. Pumping fluid into the hydraulic lifting cylinder causes the second vertical pillar 4 and platform 3 to rise with respect to vertical pillar 2 from ground level towards the vehicle floor level as shown in FIG. 3B. The lifting cycle is completed when platform 3 reaches the vehicle's floor level as shown in FIG. 3C. In this position a wheelchair can easily be rolled between the pillars into or out of the vehicle.

Once the lift has served its purpose to raise the user to the vehicle floor level, the lift needs to be stowed. A stow cycle begins with platform 3 at vehicle floor level as illustrated in FIG. 3D. The mechanical structures are so arranged that after the platform reaches floor level, application of more force from the hydraulic cylinder causes the platform to pivot around its pivot point 5 because further vertical movement of the platform is limited by the floor level stop 8. Pumping fluid into the hydraulic cylinder causes the second vertical pillar 4 to rise with respect to vertical pillar 2 in turn forcing platform 3 to fold around pivot 5 as shown in FIG. 3E because the protruding part 3a of the platform 3 engages the stop 8, causing the platform to fold in against the pillars as the pillars 2 and 4 are driven together by the hydraulic cylinder, as shown in FIGS. 3D-3F. The stowing cycle is complete when platform 3 is fully recovered to its vertical stowed position as shown in FIG. 3F.

These operations are reversible. Releasing fluid from hydraulic cylinder when platform 3 is in the fully stowed position, as shown in FIG. 3F, allows the force of gravity to first cause the second vertical pillar 4 to descend with respect to the first vertical pillar 2 allowing platform 3 to unfold around pivot 5. The unstow operation is complete when platform 3 is fully deployed and is parallel to and level with the vehicle's floor as shown in FIG. 3C. From this position a wheelchair can easily be moved from the vehicle onto the platform. Releasing additional fluid from the hydraulic cylinder causes the second vertical pillar 4 and platform 3 to descend with respect to the first vertical pillar 2 from vehicle floor level to ground level. The platform lowering operation is complete when platform 3 reaches ground level as shown in FIG. 3A.

Turning now to the electrical and hydraulic circuitry, FIG. 4 illustrates a basic prior art hydraulic circuit and electrical controlling circuit for a wheelchair lift system described above although some conventional, prior art components and options are not included.

The hydraulic circuit includes a hydraulic lifting cylinder 11, an electric motor driven hydraulic pump 12, a normally closed, electrically energized, hydraulic fluid bypass valve 13 and a hydraulic fluid reservoir tank 14. A battery BAT is connected to a contactor 15 that operates as a power switch to control electrical current through the electric motor of the electric motor driven hydraulic pump 12. The electric motor is not directly switched on and off by a mechanical, hand-held switch because the motor currents are too large and would require an excessively large electrical cable in the user's hand to control the lift. So the separate contactor or power switch 15 is used. When electric power is applied to the hydraulic pump 12, fluid is pumped from the reservoir tank 14 to the lifting cylinder 11. Check valves internal to the hydraulic pump 12 prevent reverse hydraulic fluid flow through the pump. When power is applied to the bypass valve 13 and if the hydraulic lifting cylinder 11 is under pressure from a force applied to it, such as gravity, hydraulic fluid will return from the lifting cylinder 11 through the bypass valve 13 to the reservoir tank 14.

Low current switches 16, 17, 18, 19 and 20 control the power contactor 15. These include four separate hand control switches 17, 18, 19 and 20. Two of these switches, 17 and 18 can apply power to the contactor, closing its high current circuit and thereby applying current to the electrical motor to cause the motor to operate and develop hydraulic pressure for raising the lift. Two other switches 19 and 20 operate the bypass valve 13 causing fluid to drain from the hydraulic cylinder for its lowering movement. Each of the two sets of hand control switches is controlled by a fifth switch 16, and that fifth switch is mounted to the lift as a limit switch to be engaged and change state when the platform reaches the vehicle's floor level. Consequently, when the platform 3 is at ground level or at any intermediate position between the positions of FIGS. 3A and 3C, switch 16 is in the state illustrated in FIG. 5. When the platform is rising and arrives at the position of FIG. 3C, the switch 16 switches to the opposite state and is in that state at every position above that.

There are four distinct functions performed by the wheelchair lift system described above which are:
1. Raising the platform
2. Stowing the platform
3. Deploying the platform
4. Lowering the platform When the platform 3 is at ground level, switch 16 can supply power to switches 18 and 19. Switch 18 controls raising the platform. If platform 3 is below floor level, switch 16 connects the battery positive terminal to switch 18. Manually closing switch 18 connects the battery positive terminal to power contactor 15 in turn switching battery positive to apply battery voltage to the hydraulic pump 12. Unless switch 18 is opened, the hydraulic pump continues to operate until the platform reaches floor level at which time switch 16 changes state and removes battery power from switch 18 and the power contactor 15. When it does, the circuit to the contactor 15 through switch 18 is opened which interrupts the motor current and automatically stops the ramp at that level. At that point the user gets off the lift platform and then wants to stow the lift.

The user initiates stowing of the lift by pushing the stow button, to close switch 17 which controls stowing the platform. Manually closing switch 17 connects the battery positive terminal to power contactor 15 in turn switching battery positive to the electric motor of the hydraulic pump 12. The hydraulic pump operates raising the platform 3 from the vehicle floor level position to the fully stowed position at which time the switch 17 is manually released by the user. Of course a limit switch can be included to assure that the electric motor ceases operation.

Switch 20 controls deploying the platform. If platform 3 is above floor level, switch 16 connects the battery positive terminal to switch 20. Manually closing switch 20 connects battery positive to the hydraulic bypass valve 13 operating it to cause hydraulic fluid to drain from hydraulic cylinder 11 to reservoir tank 14. The hydraulic cylinder 11 retracts until the platform reaches floor level at which time switch 16 changes state and removes battery power from switch 20 and the hydraulic bypass valve 13.

Switch 19 controls lowering the platform from the vehicle floor level. Switch 16 connects the battery positive terminal to switch 19. Manually closing switch 19 connects battery positive to the hydraulic bypass valve 13 operating the valve 13 causing hydraulic fluid to drain from hydraulic cylinder 11 to the reservoir tank 14. The hydraulic cylinder 11 retracts until platform 3 reaches ground level or switch 19 is released.

Safety is the first consideration in the operation of any wheelchair lift system. The failure of any single component, switch, sensor or control should not affect safe operation. Examining the electrical schematic of the typical wheelchair lift system depicted in FIG. 4 reveals several intrinsically unsafe design problems. First, the electrical contacts of power switch 15 could fail. Unlike low current control switches that can reliably operate for tens of thousands of cycles, high current power switches historically are much less reliable. Typically, in power switches the electrical contacts fail long before the mechanical actuating apparatus because of the relatively high currents they carry and the reactive loads to which they are connected. If the wheelchair platform were occupied during a lift cycle and the contacts in power switch 15 were to weld closed or shorted, the electric motor could not be de-energized and the platform would transition from the lift cycle directly to the stow cycle. In other words, the lift platform 3 with the occupant still on it would just keep moving past the vehicle floor level and begin to pivot to its stowed, vertical orientation.

Some wheelchair lift manufacturers have recognized the safety problem of the welded contacts and have added a second, series-connected power switch to circuits controlling hydraulic motors. Referring to FIG. 5, a first power switch 21 is shown in series with a second power switch 22 and having their respective control windings connected in parallel so both are opened and closed simultaneously. Except for the use of the dual power switches 21 and 22, the circuit of FIG. 5 is the same as the circuit of FIG. 4. The theory is that, if one contactor fails to open, it is probable that the other will open. That does reduce the probability of such a failure. As known to those in the electrical arts, the power switches can be interposed anywhere in the circuit extending from the power source to the electric motor and its return loop. Thus, they can be on the positive or negative side of a DC power circuit.

However, examining the electrical schematic shown in FIG. 5 reveals remaining safety problems. The dual contactor solution does not eliminate the possibility of an eventual failure because the second contactor is also likely to eventually fail. The predominant failure mode in the industry is stuck or welded contacts in these high power switches. If both power switches fail in a shorted mode, the result is the same cause of serious injury. In one scenario, a first switch would fail in a contact shorted mode at a time near the end of its normal life cycle. Lift operation would continue without any apparent problem until the second switch failed. Since both power switches are operated simultaneously, they both see the same number of mechanical cycles and they both see the same electrical loads and therefore both switches experience the same mechanical and electrical wear. After a first switch failure there is a higher probability of a second switch failure. Although using two series switches statistically increases the probable time to circuit failure, it does not prevent ultimate circuit failure and the resulting hazard.

It is therefore an object and feature of the invention to provide a failsafe improvement in the way these switches are controlled and operated to eliminate the possibility of having two switches fail at the same time, potentially causing the lift to fail and pass through to full stow mode causing injury.

Another object and feature of the invention is to provide a control method and circuit that is equally applicable to semiconductor power switches, and other mechanical switches for supplying power to an electrical load.

Yet another object and feature of the invention is to provide a method and circuit for controlling such power switches in other types of apparatus in which dual series connected switches supply electrical power to an electrical load.

BRIEF SUMMARY OF THE INVENTION

The invention is directed to the control of the switching of electric power to electric motors for driving a mechanical load such as a hydraulic pump but is also applicable to controlling other electrical loads. The invention detects failure modes and then prevents hazardous operation after a failure mode is detected. Generally, the invention involves (1) the monitoring of operating voltages or voltages and current that are associated with one or more contactors or other power switching devices that control the current through the load; (2) determining from these monitored parameters the status or condition of the power switches, such as their operability or whether they have malfunctioned or are damaged, by means of computer software and/or a logic control algorithm; and (3) using the determined information to control the switching process via a computer or other logic control circuitry, in a sequential way that prevents injury or damage, typically by preventing or aborting further operation of the motor or other load. If an unexpected value of voltage or current or both is sensed during the monitoring operations, then a malfunction is detected and the turning on of the switches is aborted and all switches supplying power to the load are turned off.

The circuit of the invention controls at least two power switches that are series connected between a source of electrical power and an electrical load, for energizing the load in response to a signal at a control input. The circuit has a programmed microcontroller having an input as the control input. A voltage sensor circuit has an input connected to sense the voltage between the power switches and an output connected to a microcontroller input to provide a signal representing the voltage between the switches. In some embodiments a current sensor is also provided for sensing the current through the switches that supply power to the load and has an output connected to the microcontroller.

The circuit is operated by sensing the voltage between the switches or the current through the switches to provide a sensed first value. The microcontroller compares the sensed first value to an expected first value that exists if both switches are turned off. Turning on of the switches is aborted if the sensed first value is unequal to the expected first value and a first one of the two switches is switched on if the sensed first value is equal to the expected first value. If the first switch was turned on, the voltage between the switches or the current through the switches is sensed to provide a sensed second value. The microcontroller then compares the sensed second value to an expected second value that exists if the first switch is turned on and the second one of the two switches is turned off. Turning on of the switches is aborted if the sensed second value is unequal to the expected second value. The second one of the two switches is turned on if the sensed second value is equal to the expected second value.

DETAILED DESCRIPTION OF THE INVENTION

The described embodiments of the present invention relate to a wheelchair lift system that includes a hydraulic cylinder to perform platform lifting and stowing functions. However, the invention is adaptable and applicable to systems using multiple hydraulic cylinders and to the switching of electrical power to other electrical loads.

The invention controls at least two series connected power switches and monitors operating conditions of those switches as a part of the process of turning the switches on in sequence. The purpose is to detect welded contacts or other short circuit conditions in any one of the switches and prevent the electrical load controlled by the power switches from being operated if either switch is shorted. In general such switch failures are found by sensing and inputting voltage or voltage and current values sensed in the circuit during the switch turning on process and comparing the sensed values to expected values. The expected values are the values that would be sensed if the switches are operating properly at each particular state of the switch turn on process at which the voltage or current is sensed. The turning on process continues when the expected values are found and aborted when they are unequal to the expected values. Preferably, when the turn on process is aborted, the circuit turns off both switches.

Figure 6:
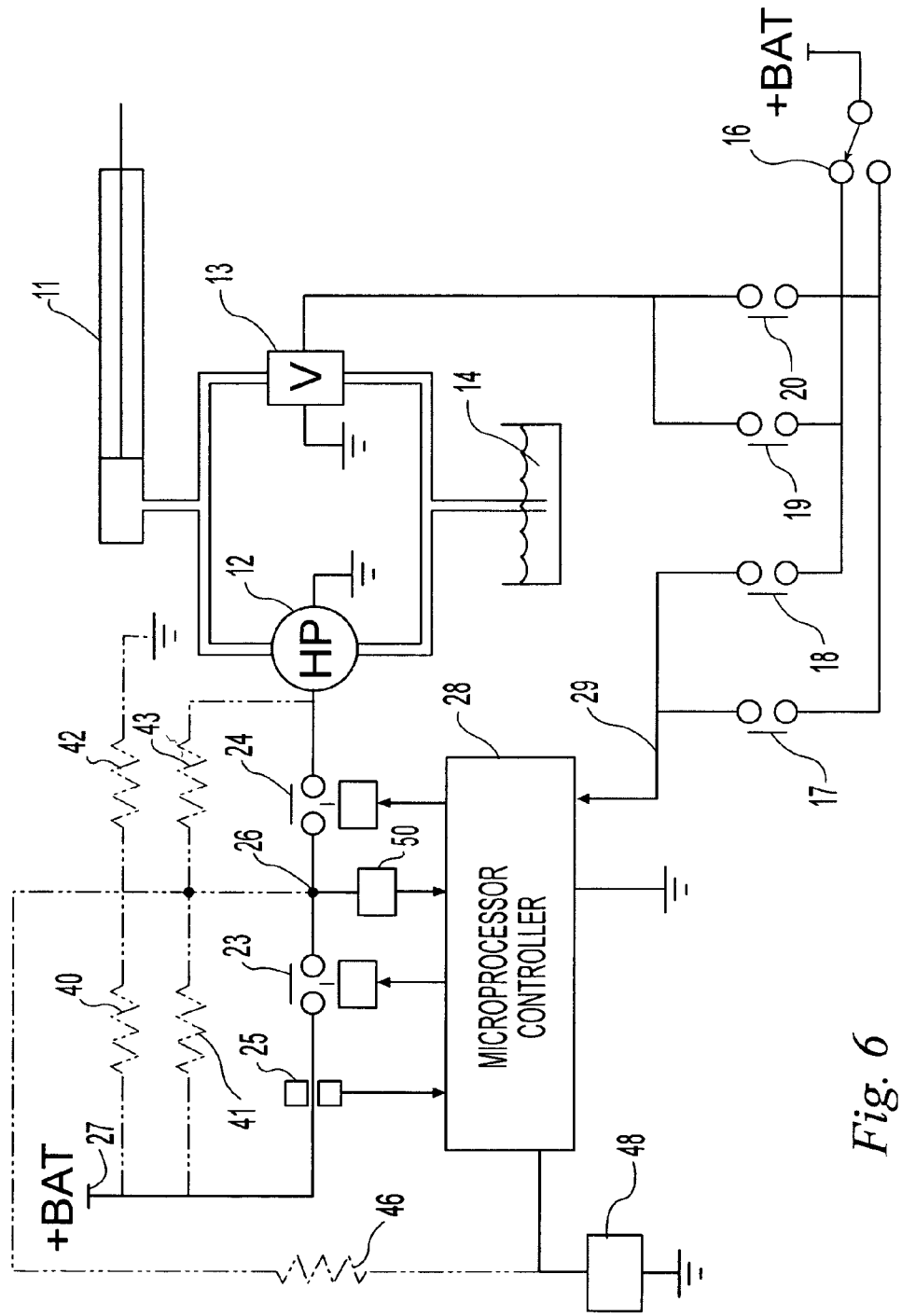
FIG. 6 is a hydraulic and electrical schematic of a hydraulic cylinder driven wheelchair lifting system and platform stowing system with redundant hydraulic motor control switches operated from and monitored by control logic and embodying the present invention.

FIG. 6 illustrates an embodiment of the invention which monitors the voltage at the node between the switches and the current through the switches in order to monitor the operating conditions of the switches. The circuit of FIG. 6 has a first power switch 23 that is connected in series with a second power switch 24. The first power switch 23 is further connected to the battery positive terminal 27 and the second power switch 24 is further connected to the hydraulic pump 12. Battery ground and hydraulic pump grounds are connected completing the series circuit. A current sensor 25 monitors the load current, i.e. the electric motor current of electric motor driven hydraulic pump 12 and provides a microprocessor controller 28 with an input signal proportional to that load current. Node 26 is a voltage tap between the first and second powers switches 24 and 25. The node 26 is connected through a voltage sensor 50 to an input of the microprocessor controller 28. The voltage sensor 50 includes an A/D converter and may be included on board the microprocessor controller 28 as available on commercially available products.

Figure 5:
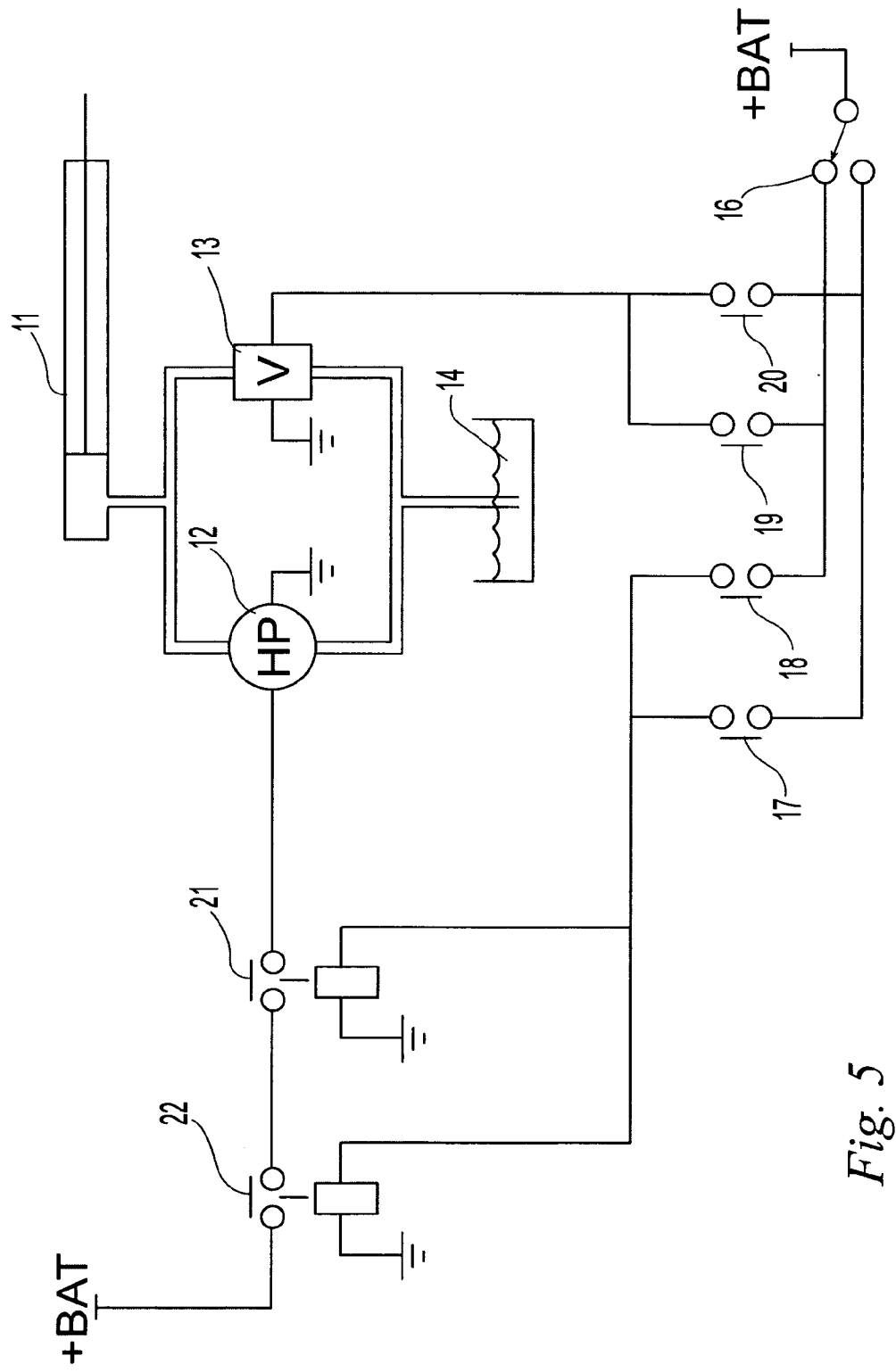
FIG. 5 is a hydraulic and electrical schematic of a typical hydraulic cylinder wheelchair lifting system and platform stowing system with dual, redundant hydraulic motor control switches.

The microprocessor controller 28 controls the operation of the first and second power switches 23 and 24, monitors the voltage at node 26 and monitors control input 29. The microprocessor controller 28 operates and controls these two power switches 23 and 24 based upon a control input 29 from the manually operated lift control switches 17 and 18 to the microprocessor controller 28. Other structural features of the embodiment of FIG. 6 are like those illustrated in FIG. 5.

Referring to FIG. 6 for an overview of the operation, the microprocessor controller 28 uses a multi-step method to sequentially turn on the first and second power switches 23 and 24 to control the electric motor driven hydraulic pump 12. The turn on process is initiated when the microprocessor controller 28 detects a first predetermined signal transition on control input 29 which is a signal originated with the user and commanding that the hydraulic pump begin operation. The microprocessor controller 28 inputs the sensed voltage at node 26 with respect to a reference voltage, usually ground. If the node voltage is at or near zero volts, which is the expected value because it indicates that the power switch 23 is not shorted, the microprocessor controller 28 turns on the first power switch 23. If the power switch 23 were shorted, the power source or battery voltage would be sensed and the turn on process would be aborted. If the first power switch 23 is turned on, the microprocessor controller 28 then retests the voltage on node 26 and measures the load current read by current sensor 25. If the microprocessor controller 28 senses that the node voltage is at or near battery level and senses that the load current is zero, the second power switch 24 is turned on completing the circuit between the battery and the hydraulic pump. Otherwise the turn on process is aborted. A zero current is expected if the second power switch 24 is not shorted. If current were sensed, that would indicate that the second power switch 24 was shorted. If a node voltage other than battery or source voltage were sensed, that would indicate that another malfunction, such as a closed, high resistance contactor or a motor short. When the microprocessor controller 28 detects a second predetermined signal on control input 29 that is a command that the hydraulic pump 12 be turned off, both of the power switches are turned off thereby breaking the series circuit between the battery 25 and the hydraulic pump 12. A failure to meet any test condition by sensing a value other than the expected value causes the microprocessor controller to turn off the power switches and to again test the control input line for a first transition.

Figure 7:
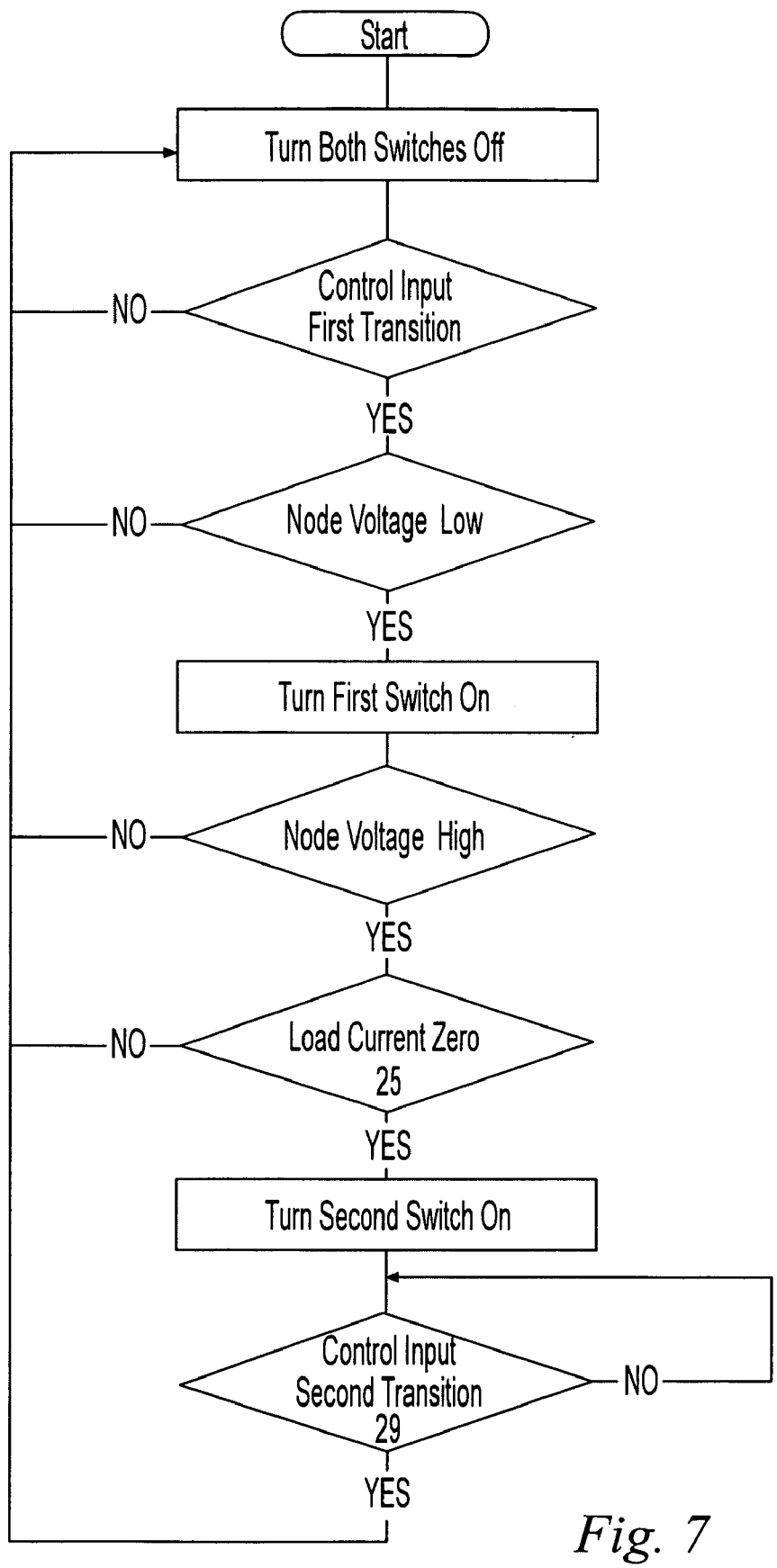
FIG. 7 is a flow diagram of the microprocessor controller program for the embodiment illustrated in FIG. 6.

The preferred method of operation and control algorithm for the embodiment of FIG. 6 is illustrated in more detail in the flow diagram of FIG. 7. Referring to FIG. 7, when power is applied, the starting point is to command both power switches 24 and 25 to "off" in case they were on. The process then enters essentially a "wait" loop, monitoring the control input line 29 for some transition. The transition could be from a logic 0 to 1 or 1 to 0 as designated by appropriate voltage or current levels. The microprocessor controller 28 looks for a unique transition that signals that the operator wants to operate a hydraulic motor. The unique transition for the circuit of FIG. 6 is the application of battery voltage at the input line 29. However, it could also be a series of pulses or codes digitally communicated to the microprocessor 28. The term "transition" is used because the circuit is not just looking for a voltage level or a particular state. It is looking for a change of state, such as a transition from a ground potential to battery potential, from a 0 state to a 1 state or from one code to another. Essentially this provides a latching point when the voltage or current is tested.

When the appropriate transition signal is received, the next step is to sense the voltage at node 26 which is between the two contactors 24 and 25. If that voltage is low, then contactor 23 is at least open. If it were shorted, we would see battery voltage at node 26. So, if the voltage is not low, then microprocessor 28 is reading an error condition and the process loops back and resets the circuit and waits for another transition. However, if the circuit has passed this test by sensing the expected voltage and we do have low voltage at the node 26, the next thing is to operate the first contactor 23 and close it. The circuit then again looks at the voltage at the node 26 between the contactors. If the node voltage is now high, the expected voltage, we now know that the contactor 23 is closed and operated properly. So, we now know two things, that this contactor 23 was reliably off and we were able to turn it reliably on.

Now consider the current sensor 25. If the second power contactor 24 is welded closed or shorted, motor current will flow. A non-zero load current will be detected and the logic will loop back to open both contactor switches 23 and 24. However, if the second contactor 24 is open, there will be the expected value of no motor current. If the motor current is zero, the second series switch or contactor 24 is open as it should be. If it is open, then the microprocessor controller 28 can safely energize it, closing it, completing the series circuit energizing the motor.

The term "expected" as used in connection with the "expected value", "expected current" or "expected voltage" means a value within a range of values that are expected when the circuit is operating properly, that is according to its design without any circuit failures or faults. As known in the art, electrical circuits have normal variations of their operating parameters within tolerance ranges. These variations are inherent in multiple replications of identical circuits, they occur as the result of aging of circuit elements and they occur as a result of variations in operating conditions, such as battery voltages or temperatures. Consequently, an expected value is not limited to a precise or discrete value, but refers to values within a range of tolerances.

It should be apparent to those skilled in the art, that many additional steps and operations can be interposed in the control algorithm illustrated in FIG. 7 as well as the other control algorithms described. The figures illustrate only the simplest description of how this operates. We could add another step here and say that, if you now don't have current, the switch can operate and it's a fault code. We want the simplest, minimum number of steps. The most direct.

Now we need to enter another decision phase, and that is we need to detect when we want to open the contactors 23 and 24. So, we are now going to look for a second and different transition on the control input 29. It could be 1 to 0, but we are looking for a specific transition. It can be simply, has the line gone from battery voltage to zero volts as a result of the switch 16 changing states due to the arrival of the platform in a horizontal orientation at the raised, floor level of the vehicle.

As long as that latter transition has not occurred, the microprocessor 28 keeps the contactors 24 and 25 energized and the platform lifts. When the latter transition signal occurs on input line 29, the microprocessor 28 then opens both contactors and enters the start state again, where it is waiting for this first transition.

The method described here with reference to FIGS. 6 and 7 has certain advantages. But, it is one preferred way of doing it because, for example, power semi-conductors can be used that have current mirrors in them that give essentially the signals that are needed at no additional cost.

FIG. 6 also illustrates three alternative embodiments of the invention in phantom. As one alternative, a voltage divider comprising high resistances 40 and 42 is connected between the battery 27 and ground. The node of the voltage divider is connected to the node 26 between the switches 23 and 24. Without a circuit to apply a known voltage to the node 26 when both switches 23 and 24 are open, the node 26 will be floating, that is it will not be connected to any voltage source. In order to avoid the uncertainty of a floating node, the voltage divider applies a voltage to the otherwise floating node 26 that is the well known function of the ratio of the resistance values of the resistances 40 and 42. However, these resistance values are sufficiently high that, when one or both switches are closed, the voltage will become essentially a function of only the connection of the node 26 through one or both switches.

There are various other alternative circuits for avoiding a floating node. For example, as a second alternative, the node 26 can be connected through a high resistance 46 to the power supply 48 for the microprocessor controller 28. Typically, this power supply 48 is at a voltage interposed between ground and the battery voltage, for example 5 volts. Consequently, when both switches 23 and 24 are open, the node is held at that power supply voltage but the resistance 46 is sufficiently high to carry only an inconsequential current. When one or both of the switches 24 and 25 are closed, the power supply voltage will be unaffected and the node 26 voltage will be essentially a function of only the connection of the node 26 through the switches 24 and 25.

As a third alternative example for applying a voltage to the node 26 in order to avoid a floating node, a voltage divider comprising high resistances 41 and 43 is connected between the battery 27 and the load, in this case the electric motor of the motor driven hydraulic pump 12. The node of the voltage divider is connected to the node 26 between the switches 23 and 24. There are other equivalent examples most conveniently comprising one or more high resistances connected to a voltage source.

Figure 8:
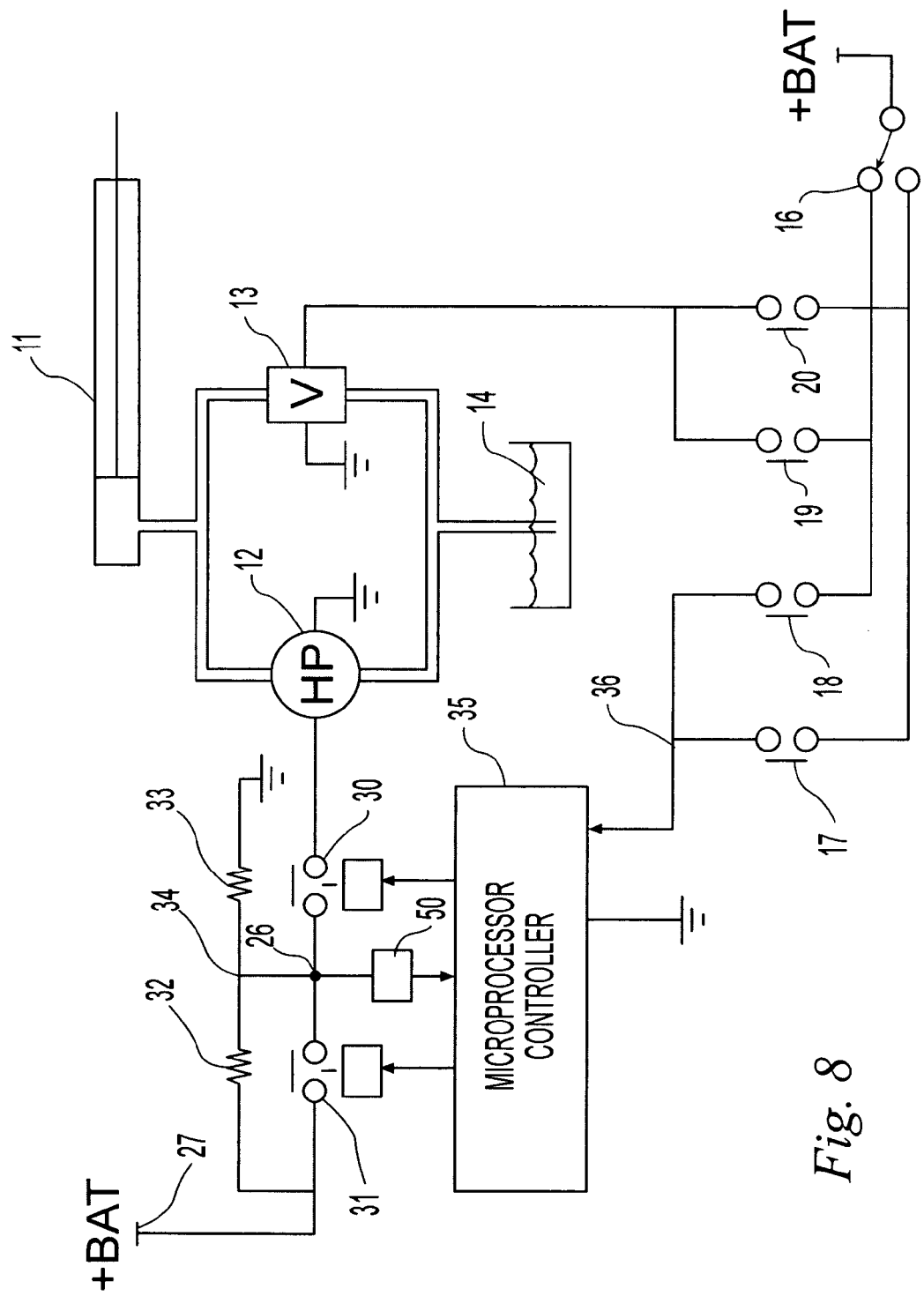
FIG. 8 is a hydraulic and electrical schematic of a hydraulic cylinder driven wheelchair lifting system and platform stowing system with redundant hydraulic motor control switches operated from and monitored by control logic and illustrating a second embodiment of the invention.
Figure 9:
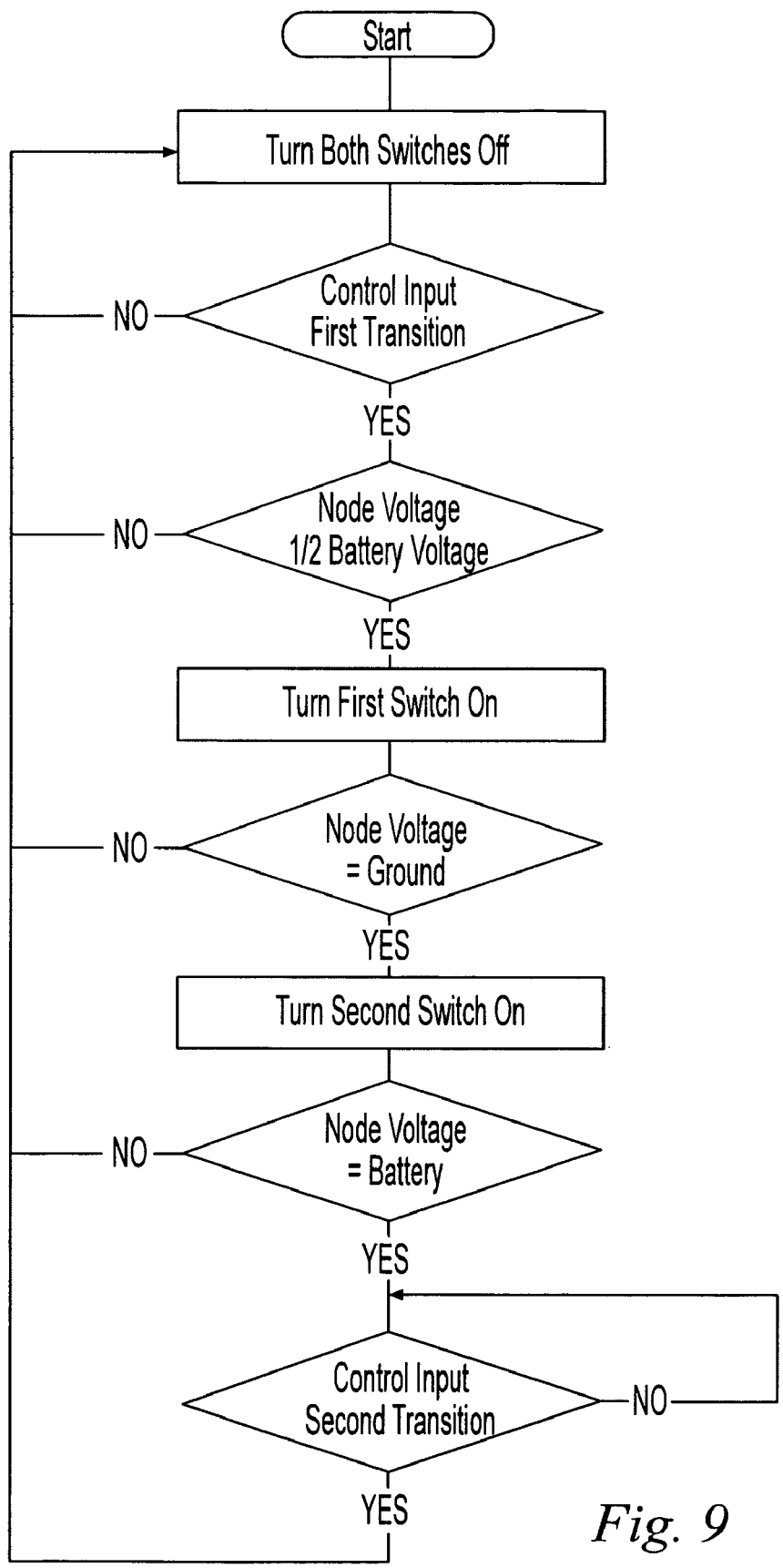
FIG. 9 is a flow diagram of the microprocessor controller program for the second embodiment of the invention illustrated in FIG. 8.

A second example of a method and circuit for solving the problem of the two contactor switch failure is illustrated in FIGS. 8 and 9. This circuit monitors the circuit operating conditions using only voltage sensing. The circuit of FIG. 8 has the first contactor 30 in series with the second contactor 31 in the manner described for FIG. 6. The controlling inputs to these contactors are connected to a microprocessor 35 that controls them. The control input 36 to the microprocessor is the same as that in FIG. 6. However, there are two resistors, one resistor 32 connected across the second contactor or power switch 31 and another resistor 33 effectively connected across or parallel to the series combination of the first power switch 30 and the motor 12. The node 34 is the node between both the resistors 32 and 33 and between the contactors 30 and 31. The node 34 also provides a voltage sensing input to the microprocessor controller 35. Preferably the values of the resistors 32 and 33 are equal and several orders of magnitude larger than the resistance of the hydraulic motor.

Although this arrangement is preferred, instead of connecting the resistor 33 to ground, the resistor 33 can be connected across the first switch 30 and achieve the same result. But, it's better to look at both the switch and the motor. The alternative circuits illustrated in FIG. 6 for applying a voltage to the node 26 in order to avoid a floating node can also be employed in the circuit of FIG. 8.

The operation of the control logic is illustrated in the flow chart of FIG. 9. The microprocessor controller 35 uses a multi step method to sequentially turn the first and second power switches on to control the hydraulic pump. The first step is, as in FIG. 7, to have the microprocessor controller 35 turn off both switches 30 and 31. As before, the microprocessor controller 35 monitors the control input 36 looking for a proper transition, as described above. If that transition is detected, and if the resistors 32 and 33 are of equal value, the logic determines "is the voltage of node 34 equal to one-half the battery voltage", which is the expected value if both switches 30 and 31 are open. Of course the resistors are simply a voltage divider circuit so they could have a different ratio of resistance value and if they were of different values the logic would be testing for a different level, for example three quarters or one quarter of the battery voltage.

If both switches 30 and 31 are "off", i.e. open, that means these two resistors 32 and 33 are isolated from anything in the circuit except the battery terminals so the only voltage that can appear across them is the battery voltage. So, if both switches 30 and 31 are open, the resistors form a simple voltage divider and the voltage at node 34 as read by the microprocessor must be the same proportion of the battery voltage as the ratio of the resistors. If the microprocessor finds that expected voltage value, then both switches are "open" and the next step is to turn on the first switch 30. Then, after switch 30 is switched on, the microprocessor retests the node 34 to see if the node 34 is now at ground level voltage. If the node voltage is now at ground level, two things are established. One, it was previously established that both switches were open, they were not shorted, and the first switch 30 could then be operated and closed. After closing switch 30, we also verified that we now have a circuit to ground through the motor. That is the reason for having one side of the resistor 33 at ground, instead of connected directly across the switch 30. We are able to look at both the switch 30 and the electric motor and establish that there is a good circuit through both. If that condition has been met by sensing the expected voltage value, the microprocessor then turns on, i.e. closes, switch 31 and again tests the node 34 voltage. If the microprocessor then finds the battery voltage on node 34, we know that switch 31 has operated properly. The microprocessor now monitors the control input 36 for a second transition from the manual control switches that signals to de-energize the circuit and stop motor operation. Once that transition is detected, the logic reenters the testing of the first transition to begin a new cycle. If the microprocessor did not find the expected battery voltage at node 34, the control logic loops back and opens both switches 30 and 31 thereby breaking the series circuit between the battery 27 and the hydraulic pump 12 to prevent operation of the electric motor. A failure to meet any test condition, that is a failure to find the expected voltage value, causes the microprocessor controller 35 to turn off the power switches and to again test the control input line for a first transition.

Figure 1:
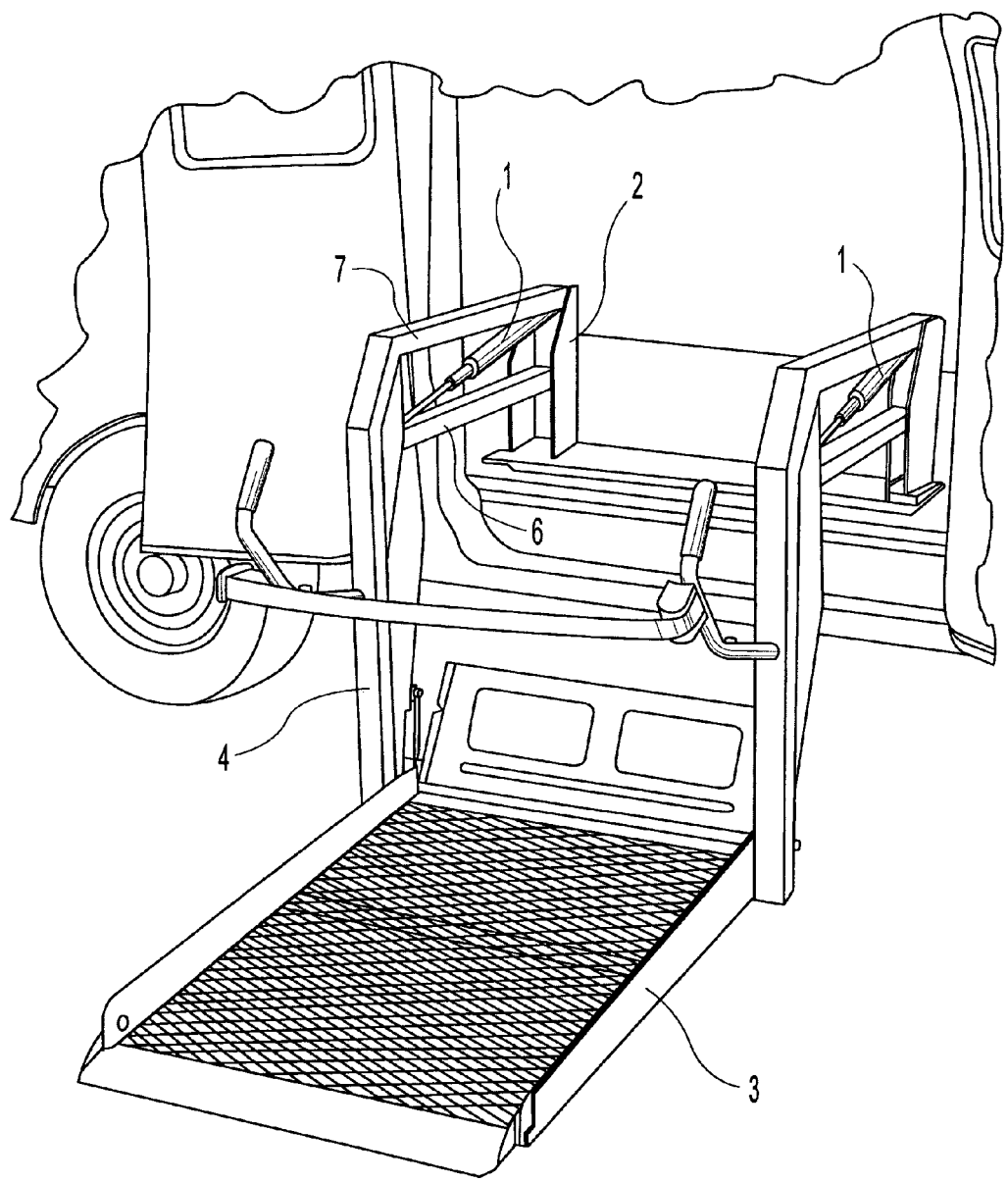
FIG. 1 is a view in perspective of a common wheelchair lift that is commercially available from The Braun Corporation.
Figure 2:
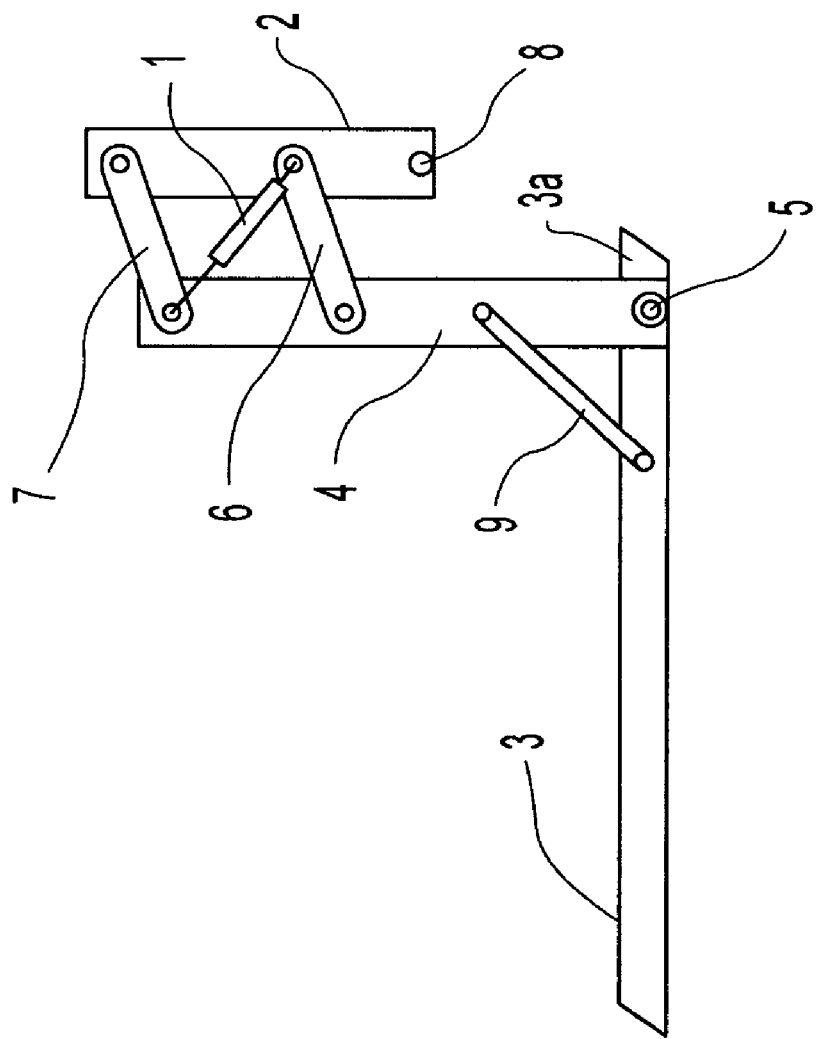
FIG. 2 is a side view of a typical single cylinder hydraulic wheelchair lift system.
Figure 3:
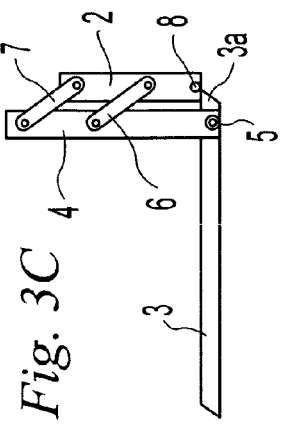
FIG. 3A through FIG. 3C depict the lifting cycle of the lifting platform from ground level to floor level.
FIG. 3D through FIG. 3F depict the stowing cycle of the lifting platform from vehicle floor level to its fully stowed position.
Figure 3:
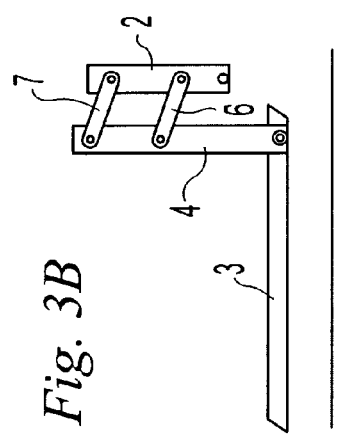
Figure 3:
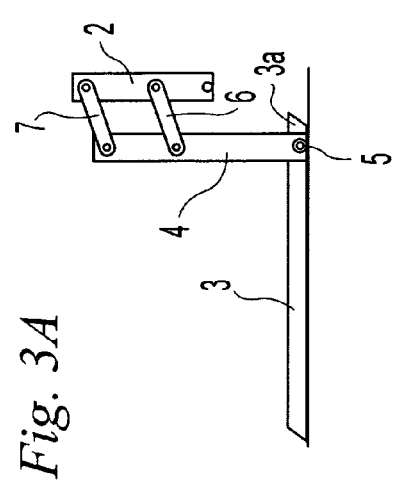
Figure 3:
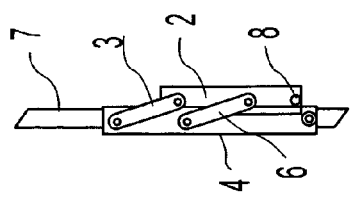
Figure 3:
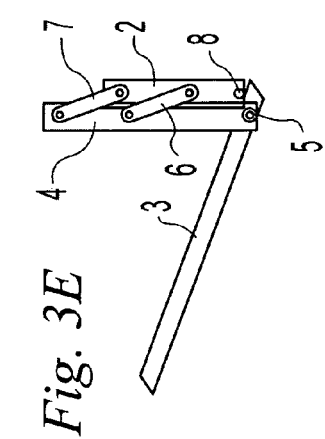
Figure 3:
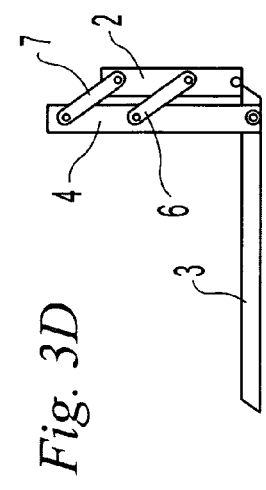
Figure 4:
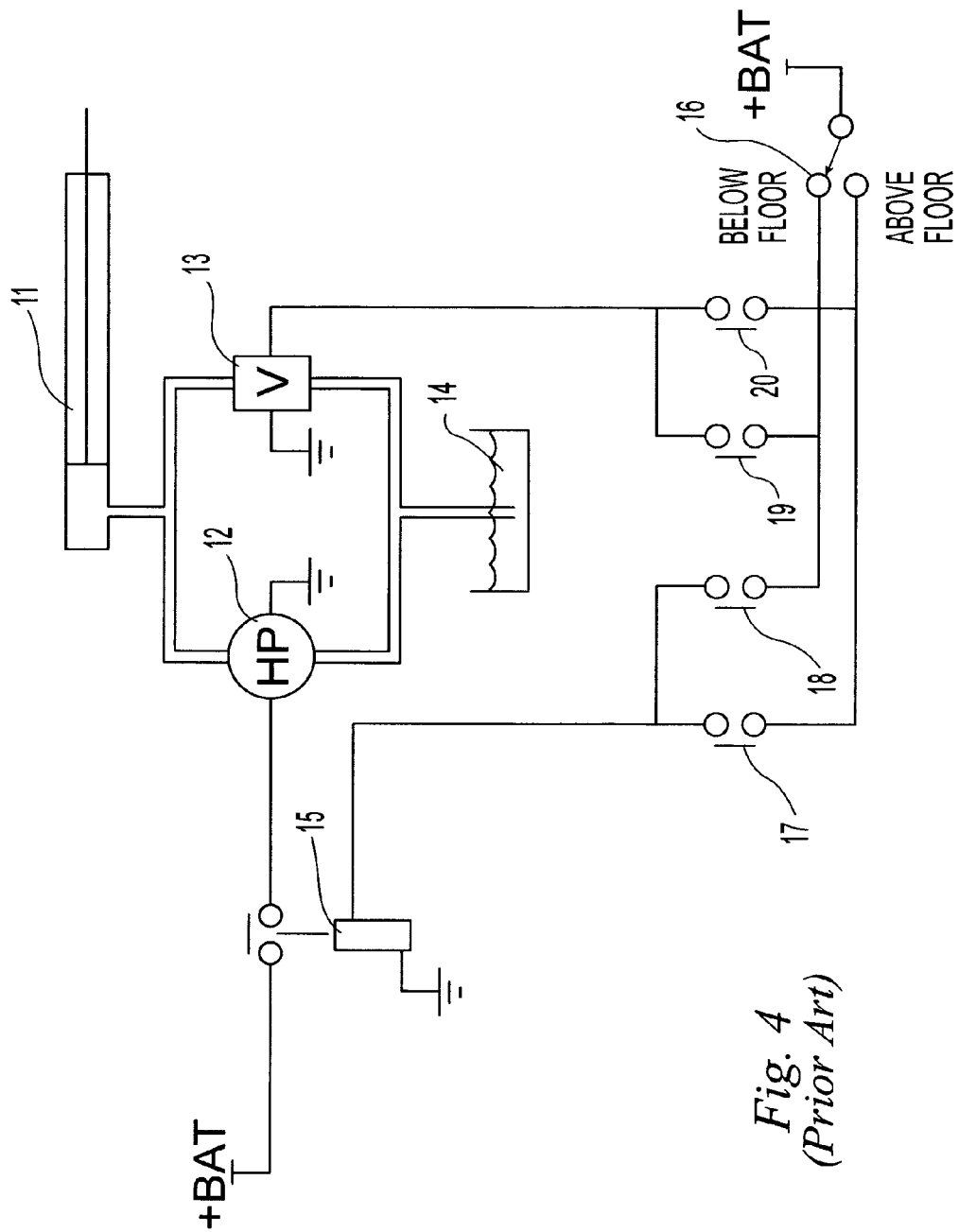
FIG. 4 is a hydraulic and electrical schematic of a typical hydraulic cylinder operated wheelchair lifting system and platform stowing system.

Circuits embodying the invention can also be applied to retrofit a prior art circuit like that illustrated in FIG. 4. This can be done in a way that uses the existing power switch of the existing circuit but also supplies a second power switch for connection between the existing power switch and the power source. The control input to the existing switch is disconnected from the manual switches and the control input wire from the manual switches is connected as the control input to the microprocessor controller. The control input to the power switches are connected to outputs from the microprocessor controller so that the controller controls both the previously existing power switch and the second power switch. In other words, the preexisting circuit is rewired so it becomes like the illustrated embodiments or other embodiments of the invention.

Figure 10:
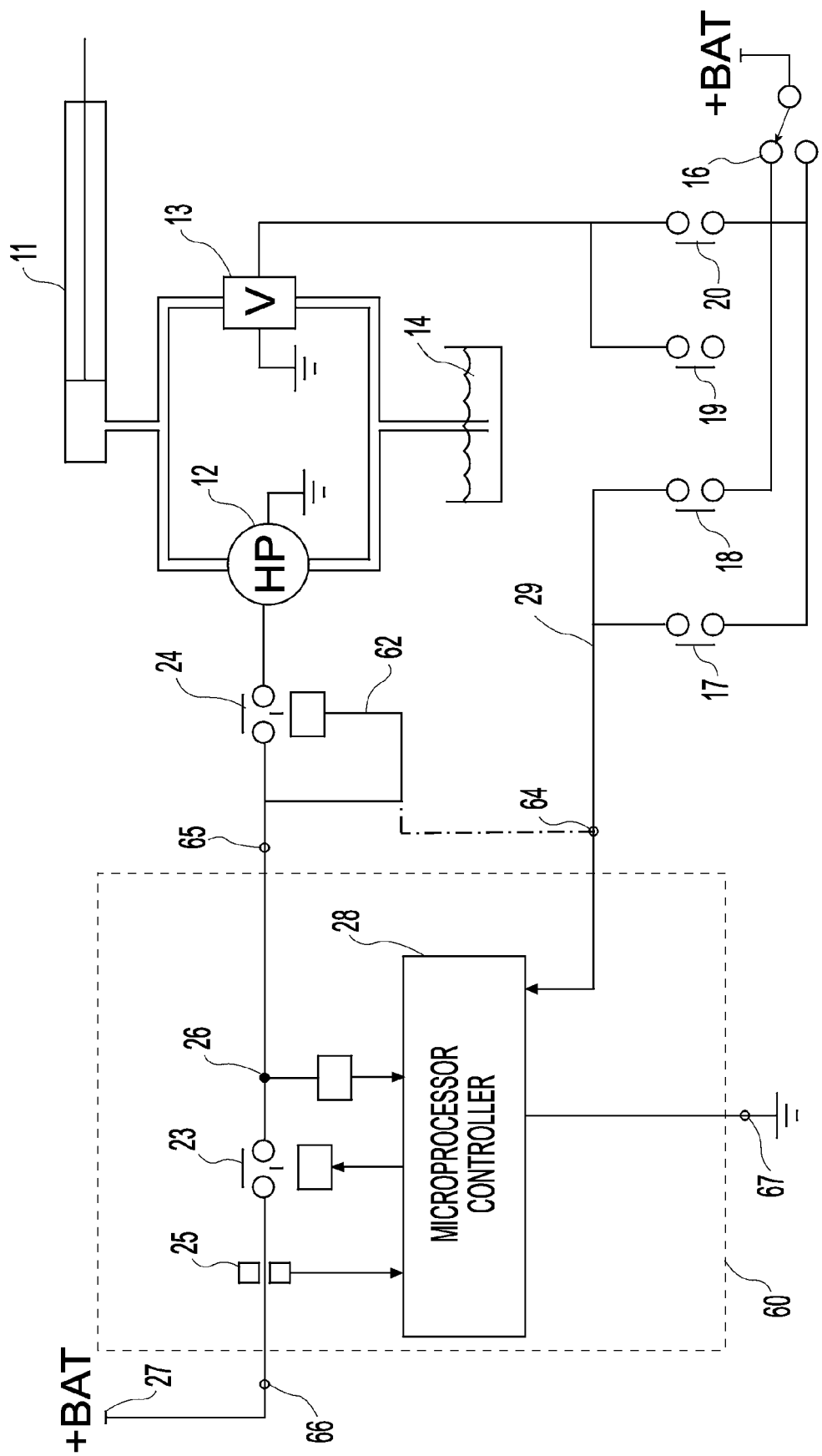
FIG. 10 is a hydraulic and electrical schematic of an alternative embodiment of the invention for retrofitting an existing hydraulic cylinder driven wheelchair lifting system and platform stowing system with redundant hydraulic motor control switches operated from and monitored by control logic embodying the present invention.

Two other ways that the invention can be employed to retrofit a preexisting, prior art control circuit are illustrated in FIG. 10. Electrically, the circuit of FIG. 10 is like the circuit of FIG. 6 except for the changes described. However, the principles applied in FIG. 10 can also be applied to the circuit of FIG. 8 or other embodiments of the invention. FIG. 10 shows additional circuitry 60 added to the conventional prior art circuit described above. Like the previously described retrofit circuit, the existing power switch 24 is connected in series with a power switch 23 of the additional circuitry 60 and the control input 29 from the manual switches 17-20 is severed and connected to an input to the controller 28. However, instead of connecting the control input from the power switch 24 to an output of the controller 28, the control input 62 is electrically connected to the node between the switches as illustrated in solid lines in FIG. 10. One advantage of this implementation of the invention is that only four terminals 64-67 are required to be connected to the preexisting circuit and two of them are to the power source and ground.

Although the controller 28 of FIG. 10 only controls one power switch 23, it is still able to sense node voltages and, if a current sensor 25 is used, sense load current. Consequently, the FIG. 10 circuit can still sense the circuit operational values, determine at multiple stages whether the expected values are sensed and then either abort or continue the turn on process. More specifically, with both power switches 23 and 24 open, the controller is programmed so that, when a signal is received by the controller 28 from the control input signal 29, the controller 28 can sense the voltage at node 26 which is expected to be intermediate the power source voltage and ground (or a particular voltage if the node is connected to a voltage source as in the alternatives of FIG. 6). Using current sensor 25, the controller 28 can also sense the load current which is expected to be zero. If either value is not the expected value, the turn on is aborted. For example, if the power switch 24 is shorted, the voltage at node 26 will be an unexpected value of zero or ground potential. If the power switch 23 is shorted, the voltage sensed at node 26 will be the supply or battery voltage and the current will not be zero, both of which are unexpected values. If the expected values are detected, the controller 28 closes switch 23. Thereafter, the expected sensed current should be some non-zero value and the expected voltage value at node 26 is the supply or battery voltage. If an unexpected value is detected, the switch 23 is opened by the controller 28.

As an alternative to the circuit connection illustrated in solid lines in FIG. 10, the control input 62 to the existing switch 24 can remain electrically connected to the manual switches, as illustrated in phantom in FIG. 10, instead of being connected to the node between switches 23 and 24. In this configuration, the switch 24 operates in the manner it did in the prior art connection, the switch 23 is controlled by the controller 28 and the circuit monitors the operating conditions as described in accordance with the previously described principles of the invention.

Those embodiments of the invention that have a current sensor for sensing the load current can additionally be provided with a circuit breaker functionality or utility without the need for additional circuitry. They require only additional programming or logic functions. The connection of the current sensor to an input of the controller allows the controller to continuously monitor the load current from the time the switches are turned on. Consequently, the controller can be additionally programmed or constructed to continuously compare the sensed load current to a stored value of a maximum permissible load current and open one or both switches when the sensed current exceeds the maximum permissible load current. Therefore, such embodiments of the invention can eliminate the need for a conventional circuit breaker or alternatively can provide the added safety of a second or backup circuit breaker function.

As known to those skilled in the art, there are a variety of commercially available, non-microprocessor based controllers that can provide the controller functions and therefore are equivalent and can be substituted for the microprocessor controller or can separately perform the filtering and other functions. The sensing functions can be performed by separate circuitry or can be provided on-board a controller. Suitable controllers can include equivalent digital and analog circuits available in the commercial marketplace. Examples of controller components include field programmable gate arrays, programmable analog filters, digital signal processors, field programmable analog arrays and logic gate arrays. Such circuits can be constructed of diodes and transistors. Therefore the term "controller" is used to generically refer to any of the combinations of digital logic and analog signal processing circuits that are available for performing the logic and signal processing operations described above.

Additionally, it is not necessary that the described microprocessor controller be dedicated to or limited to operation with the present invention. As those skilled in the art will recognize, such controllers can control multiple machines and circuits simultaneously. As a particular example, modern vehicles are equipped with one or more microprocessors that receive sensed data and control many devices on the vehicle, including the engine components. The circuit of the present invention can also be controlled by such an on board microprocessor and the circuit components can communicate with it over a vehicle data bus connected to that microprocessor.

An important aspect of the invention, as described above, is the measurement of the voltage at the node between the power switches in order to determine the state of the switches, that is whether a switch or multiple switches are open or closed. Those skilled in the electronics art will recognize that a voltage is a potential difference between two points. Therefore, sensing the voltage at a node between two power switches involves sensing the potential at the node with respect to a reference potential. However, the reference potential can be the potential at a different point in the circuit and is not confined to a preferred reference, such as circuit common or ground. A variety of circuits will be apparent to those skilled in the art to sense the voltage between the node and another point in the circuit. In fact there are many points in a circuit that are available for use as the reference and the reference can be different at the different times the node voltage is sensed.

While certain preferred embodiments of the present invention have been disclosed in detail, it is to be understood that various modifications may be adopted without departing from the spirit of the invention or scope of the following claims.

The invention claimed is:

1. A method for turning on at least two power switches that are series connected and interposed between a source of electrical power and an electrical load, for energizing the load in response to a signal at a control input, the method comprising:
   (a) applying a known voltage to a node between the switches, when both switches are open, through a resistance connected to a voltage source;
   (b) sensing the voltage between the switches with respect to a reference to provide a sensed first value;
   (c) comparing the sensed first value to an expected first value that exists if both switches are turned off, the expected first value being said known voltage;
   (d) aborting turning on of the switches and discontinuing the method if the sensed first value is unequal to the expected first value and turning on a first one of the two switches if the sensed first value is equal to the expected first value;
   (e) if the first switch was turned on, sensing the voltage between the switches with respect to a reference or the current through the switches to provide a sensed second value;
   (f) comparing the sensed second value to an expected second value that exists if the first switch is turned on and the second one of the two switches is turned off; and
   (g) aborting turning on of the switches if the sensed second value is unequal to the expected second value and turning on the second one of the two switches if the sensed second value is equal to the expected second value.

2. A method in accordance with claim 1 wherein the sensed second value is the voltage between the switches and wherein, after the first switch is turned on and before the second switch is turned on, interposing the steps of:
   (a) sensing the current through the switches to provide a sensed third value;
   (b) aborting turning on of the switches if the sensed third value is unequal to substantially zero and turning on the second one of the two switches if the sensed third value is equal to substantially zero.

3. A method in accordance with claim 1 wherein the sensed second value is the voltage between the switches and wherein, after the second switch is turned on, the method further comprises:
   (a) sensing the voltage between the switches to provide a sensed third value;
   (b) turning off the switches and discontinuing the method if the sensed third value is unequal to substantially the voltage of the source of electrical power.

4. A method in accordance with claim 1 or 2 or 3 wherein the method further comprises continuously comparing the sensed load current to a stored value of a maximum permissible load current and opening at least one power switch when the sensed current exceeds the maximum permissible load current.

5. A circuit for controlling at least two power switches that are series connected and interposed between a source of electrical power and an electrical load, for energizing the load in response to a signal at a control input, the circuit comprising:
   (a) a voltage sensor circuit having an input connected to sense the voltage connected at a node between the power switches and having an output connected to a controller input to provide a signal representing the voltage between the switches;
   (b) a controller having an input as the control input, the controller being programmed to
      (i) input the voltage between the switches with respect to a reference to provide a sensed first value;
      (ii) compare the sensed first value to an expected first value that exists if both switches are turned off;
      (iii) abort turning on of the switches if the sensed first value is unequal to the expected first value and turning on a first one of the two switches if the sensed first value is equal to the expected first value; and
   (c) a voltage divider circuit having a resistance connected between the source of electrical power and the node between the switches and a second resistance connected between the node and a common to which the load and the source of electrical power are also connected and wherein the controller is further programmed to
      (i) if the first switch was turned on, input the voltage between the switches with respect to a reference to provide a sensed second value;
      (ii) compare the sensed second value to an expected second value that exists if the first switch is turned on and the second one of the two switches is turned off; and
      (iii) abort turning on of the switches if the sensed second value is unequal to the expected second value and turning on the second one of the two switches if the sensed second value is equal to the expected second value.

6. A circuit for controlling at least two power switches that are series connected and interposed between a source of electrical power and an electrical load, for energizing the load in response to a signal at a control input, the circuit comprising:
   (a) a voltage sensor circuit having an input connected to sense the voltage connected at a node between the power switches and having an output connected to a controller input to provide a signal representing the voltage between the switches;
   (b) a controller having an input as the control input, the controller being programmed to
      (i) input the voltage between the switches with respect to a reference to provide a sensed first value;
      (ii) compare the sensed first value to an expected first value that exists if both switches are turned off;
      (iii) abort turning on of the switches if the sensed first value is unequal to the expected first value and turning on a first one of the two switches if the sensed first value is equal to the expected first value; and
   (c) a voltage divider circuit having a resistance connected between the source of electrical power and the node between the switches and a second resistance connected between the node and the load and wherein the controller is further programmed to
  (i) if the first switch was turned on, input the voltage between the switches with respect to a reference to provide a sensed second value;
  (ii) compare the sensed second value to an expected second value that exists if the first switch is turned on and the second one of the two switches is turned off; and
  (iii) abort turning on of the switches if the sensed second value is unequal to the expected second value and turning on the second one of the two switches if the sensed second value is equal to the expected second value.

7. A circuit for controlling at least two power switches that are series connected and interposed between a source of electrical power and an electrical load, for energizing the load in response to a signal at a control input, the circuit comprising:
  (a) a voltage sensor circuit having an input connected to sense the voltage connected at a node between the power switches and having an output connected to a controller input to provide a signal representing the voltage between the switches; and
  (b) a controller having an input as the control input, the controller being programmed to
    (i) input the voltage between the switches with respect to a reference to provide a sensed first value;
    (ii) compare the sensed first value to an expected first value that exists if both switches are turned off;
    (iii) abort turning on of the switches if the sensed first value is unequal to the expected first value and turning on a first one of the two switches if the sensed first value is equal to the expected first value; and
  (c) a resistance connected between the node between the switches and a reference voltage to maintain the node at a known voltage when both switches are open and wherein the controller is further programmed to
    (i) if the first switch was turned on, input the voltage between the switches with respect to a reference to provide a sensed second value;
    (ii) compare the sensed second value to an expected second value that exists if the first switch is turned on and the second one of the two switches is turned off; and
    (iii) abort turning on of the switches if the sensed second value is unequal to the expected second value and turn on the second one of the two switches if the sensed second value is equal to the expected second value.

8. A circuit in accordance with claim 5 or 6 or 7 and further comprising:
  a current sensing circuit connected at a location in the power supply circuit extending from the source of electrical power to the electrical load to provide a current signal, the current sensing circuit having an output connected to a controller input to provide a signal representing current through the switches and wherein the controller is further programmed to
    (i) if the first switch was turned on, input the sensed current value through the switches to provide a sensed second value;
    (ii) compare the sensed second value to an expected second value that exists if the first switch is turned on and the second one of the two switches is turned off; and
    (iii) abort turning on of the switches if the sensed second value is unequal to the expected second value and turning on the second one of the two switches if the sensed second value is equal to the expected second value.

9. A circuit in accordance with claim 5 or 6 or 7 or 8 wherein the controller is additionally programmed or constructed to continuously compare the sensed load current to a stored value of a maximum permissible load current and to open at least one power switch when the sensed current exceeds the maximum permissible load current.

10. A method in accordance with claim 1, wherein:
  (a) the known voltage is applied to the node between the switches through a voltage divider that extends from the side of the series switches that is connected to the source of electrical power to either the side of the series switches that is connected to the load or to ground; and
  (b) the expected first value is a proportion of the voltage of the electrical power source determined by the ratio of the resistances of the voltage divider.

11. A method in accordance with claim 10 wherein the sensed second value is the voltage between the switches and wherein, after the first switch is turned on and before the second switch is turned on, interposing the steps of:
  (a) sensing the current through the switches to provide a sensed third value;
  (b) aborting turning on of the switches if the sensed third value is unequal to substantially zero and turning on the second one of the two switches if the sensed third value is equal to substantially zero.

12. A method in accordance with claim 10 wherein the sensed second value is the voltage between the switches and wherein, after the second switch is turned on, the method further comprises:
  (a) sensing the voltage between the switches to provide a sensed third value;
  (b) turning off the switches and discontinuing the method if the sensed third value is unequal to substantially the voltage of the source of electrical power.

13. A method in accordance with claim 10 or 11 or 12 wherein the method further comprises continuously comparing the sensed load current to a stored value of a maximum permissible load current and opening at least one power switch when the sensed current exceeds the maximum permissible load current.

14. A circuit in accordance with claim 8 wherein the controller is additionally programmed or constructed to continuously compare the sensed load current to a stored value of a maximum permissible load current and to open at least one power switch when the sensed current exceeds the maximum permissible load current.

* * * * *

UNITED STATES PATENT AND TRADEMARK OFFICE
CERTIFICATE OF CORRECTION

PATENT NO. : 7,408,274 B2  Page 1 of 1
APPLICATION NO. : 11/319825
DATED : August 5, 2005
INVENTOR(S) : James D. Sullivan and John A. Melvin It is certified that error appears in the above-identified patent and that said Letters Patent is hereby corrected as shown below:

Col. 16, in Claim 9, line 1, delete "or 8".

Signed and Sealed this

Sixteenth Day of September, 2008

JON W. DUDAS
*Director of the United States Patent and Trademark Office*

UNITED STATES PATENT AND TRADEMARK OFFICE
CERTIFICATE OF CORRECTION

PATENT NO. : 7,408,274 B2 Page 1 of 1
APPLICATION NO. : 11/319825
DATED : August 5, 2008
INVENTOR(S) : James D. Sullivan and John A. Melvin It is certified that error appears in the above-identified patent and that said Letters Patent is hereby corrected as shown below:

Col. 16, in Claim 9, line 13, delete "or 8".

This certificate supersedes the Certificate of Correction issued September 16, 2008.

Signed and Sealed this

Seventh Day of October, 2008

JON W. DUDAS
*Director of the United States Patent and Trademark Office*